United States Patent
Hayashi et al.

(10) Patent No.: US 8,754,978 B2
(45) Date of Patent: Jun. 17, 2014

(54) SEMICONDUCTOR DEVICE

(75) Inventors: Hidetoshi Hayashi, Fujisawa (JP);
Takuro Yamamoto, Funabashi (JP);
Tatsuhiko Yamazaki, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/594,972

(22) Filed: Aug. 27, 2012

(65) Prior Publication Data

US 2013/0063633 A1 Mar. 14, 2013

(30) Foreign Application Priority Data

Sep. 8, 2011 (JP) ................. 2011-196499

(51) Int. Cl.
*H04N 5/232* (2006.01)
*G03B 13/32* (2006.01)

(52) U.S. Cl.
USPC ..................... 348/350; 396/96; 250/201.2

(58) Field of Classification Search
USPC .......... 348/350; 396/121, 96, 100; 250/201.2, 250/214 P
See application file for complete search history.

(56) References Cited

U.S. PATENT DOCUMENTS

| | | | | |
|---|---|---|---|---|
| 4,618,235 A * | 10/1986 | Ishida et al. | ............... | 396/96 |
| 4,931,822 A * | 6/1990 | Yamano | ............... | 396/96 |
| 6,470,148 B2 * | 10/2002 | Ide et al. | ............... | 396/80 |
| 6,556,787 B1 * | 4/2003 | Kurokawa | ............... | 396/96 |
| 6,597,868 B2 | 7/2003 | Suda | ............... | 396/111 |
| 6,735,384 B2 * | 5/2004 | Nakamura | ............... | 396/80 |
| 6,937,818 B2 * | 8/2005 | Nakata et al. | ............... | 396/96 |
| 7,102,675 B1 * | 9/2006 | Tokunaga | ............... | 348/297 |
| 7,460,779 B2 * | 12/2008 | Nakata | ............... | 396/96 |
| 7,493,034 B2 * | 2/2009 | Nakata | ............... | 396/96 |
| 8,040,400 B2 | 10/2011 | Hayashi | | |
| 8,279,326 B2 * | 10/2012 | Yoshida | ............... | 348/350 |
| 8,400,557 B2 * | 3/2013 | Sato et al. | ............... | 348/345 |
| 8,538,251 B2 * | 9/2013 | Yamamoto et al. | ........... | 396/121 |
| 2010/0201856 A1 | 8/2010 | Hayashi et al. | | |
| 2013/0120011 A1 * | 5/2013 | Yamazaki et al. | ......... | 324/750.3 |
| 2013/0202281 A1 * | 8/2013 | Yamazaki et al. | ............. | 396/96 |

FOREIGN PATENT DOCUMENTS

| | | |
|---|---|---|
| JP | 7-298145 A | 11/1995 |
| JP | 11-150686 A | 6/1999 |
| JP | 2001-305415 A | 10/2001 |

* cited by examiner

*Primary Examiner* — John Villecco
(74) *Attorney, Agent, or Firm* — Fitzpatrick, Cella, Harper & Scinto

(57) ABSTRACT

A semiconductor device includes a pair of sensor units each of which includes a photoelectric conversion unit, a signal holding unit and a transfer unit, and outputs a signal held by the signal holding unit, comprising a control unit including a detector unit, wherein when one of the pair of sensor units operates in a first mode, the other operates in a second mode, the detector unit detects that the output has reached a predetermined value after the one starting a signal transfer, the one ends the signal transfer in response to the detection and determines the held signal, the control unit generates a control signal after that, and the other in the second mode accumulates generated charges and starts a signal transfer in accordance with the control signal, then ends the signal transfer and determines the held signal.

12 Claims, 11 Drawing Sheets

SEMICONDUCTOR DEVICE

BACKGROUND OF THE INVENTION

1. Field of the Invention

The present invention relates to a semiconductor device.

2. Description of the Related Art

One kind of semiconductor device for focus detection includes a pair of sensor units. Upon detecting that the output of one sensor unit to be used for detection has reached a predetermined value, processing of the focus detection signal of the other sensor unit to be used for signal is controlled. More specifically, each of the pair of sensor units includes photoelectric conversion units. This semiconductor device controls the accumulation operation of charges generated by the photoelectric conversion units of the sensor unit for signal in accordance with the signal corresponding to charges generated by the photoelectric conversion units of the sensor unit for detection. The charge accumulation operation is controlled by, for example, controlling the charge accumulation time or the accumulated charge amount. More specifically, when the object has a low luminance, the charge accumulation time is prolonged, or the accumulated charge amount is increased. When the object has a high luminance, the charge accumulation time is shortened, or the accumulated charge amount is decreased. This allows for control of the charge accumulation operation of the photoelectric conversion units of the sensor unit for signal.

After that, the signal corresponding to the charges accumulated in the sensor unit for signal can be output, as information for focus detection, to a calculation unit that executes a focus detection operation. Actually, each sensor unit can include about 30 to 80 photoelectric conversion units arranged in a line or in an array. Two pairs of sensor units are prepared, and focus detection is performed by a phase-difference detection method using two images formed by the sensor units.

Apart from the above-described series of focus detection operations, another focus detection operation may independently be performed using the signal corresponding to the charges generated by the sensor unit for detection as information for focus detection. This is expected to enable more accurate focus detection. However, when the control signal of the sensor unit for signal is switched, noise may mix in the signal of the sensor unit for detection. For example, crosstalk noise can mix in due to wiring capacitance coupling between signal wirings. Noise can also mix in when processing of the signal corresponding to the charges accumulated in the sensor unit for signal starts.

SUMMARY OF THE INVENTION

The present invention provides a semiconductor device advantageous in using a signal corresponding to charges generated by a sensor unit for detection as information for focus detection.

One of the aspects of the present invention provides a semiconductor device includes a pair of sensor units each of which includes a photoelectric conversion unit, a signal holding unit, and a transfer unit and outputs a signal corresponding to a signal held by the signal holding unit, comprising a control unit including a detector unit, wherein the signal holding unit holds the signal corresponding to charges generated by the photoelectric conversion unit, the transfer unit transfers, to the signal holding unit, the signal corresponding to the charges generated by the photoelectric conversion unit in a conductive state, when one of the pair of sensor units operates in a first mode, the other operates in a second mode, after the transfer unit in the conductive state has started signal transfer in the sensor unit operating in the first mode, the detector unit detects that the signal output from the sensor unit has reached a predetermined value, the sensor unit operating in the first mode sets the transfer unit to a non-conductive state in response to the detection to end the signal transfer and thus determine the signal held by the signal holding unit, the control unit generates a control signal after an elapse of a predetermined time from the detection, and the sensor unit operating in the second mode sets the transfer unit of the sensor unit to the non-conductive state so as to accumulate the charges generated by the photoelectric conversion unit, sets the transfer unit of the sensor unit operating in the second mode in the conductive state in accordance with the control signal so as to start transfer of the signal corresponding to the generated charges, and then sets the transfer unit in the non-conductive state to end the signal transfer and thus determine the signal held by the signal holding unit.

Further features of the present invention will become apparent from the following description of exemplary embodiments with reference to the attached drawings.

BRIEF DESCRIPTION OF THE DRAWINGS

FIG. 3 is a timing chart of an operation that allows noise to mix in;

DESCRIPTION OF THE EMBODIMENTS

First Embodiment

Figure 1:
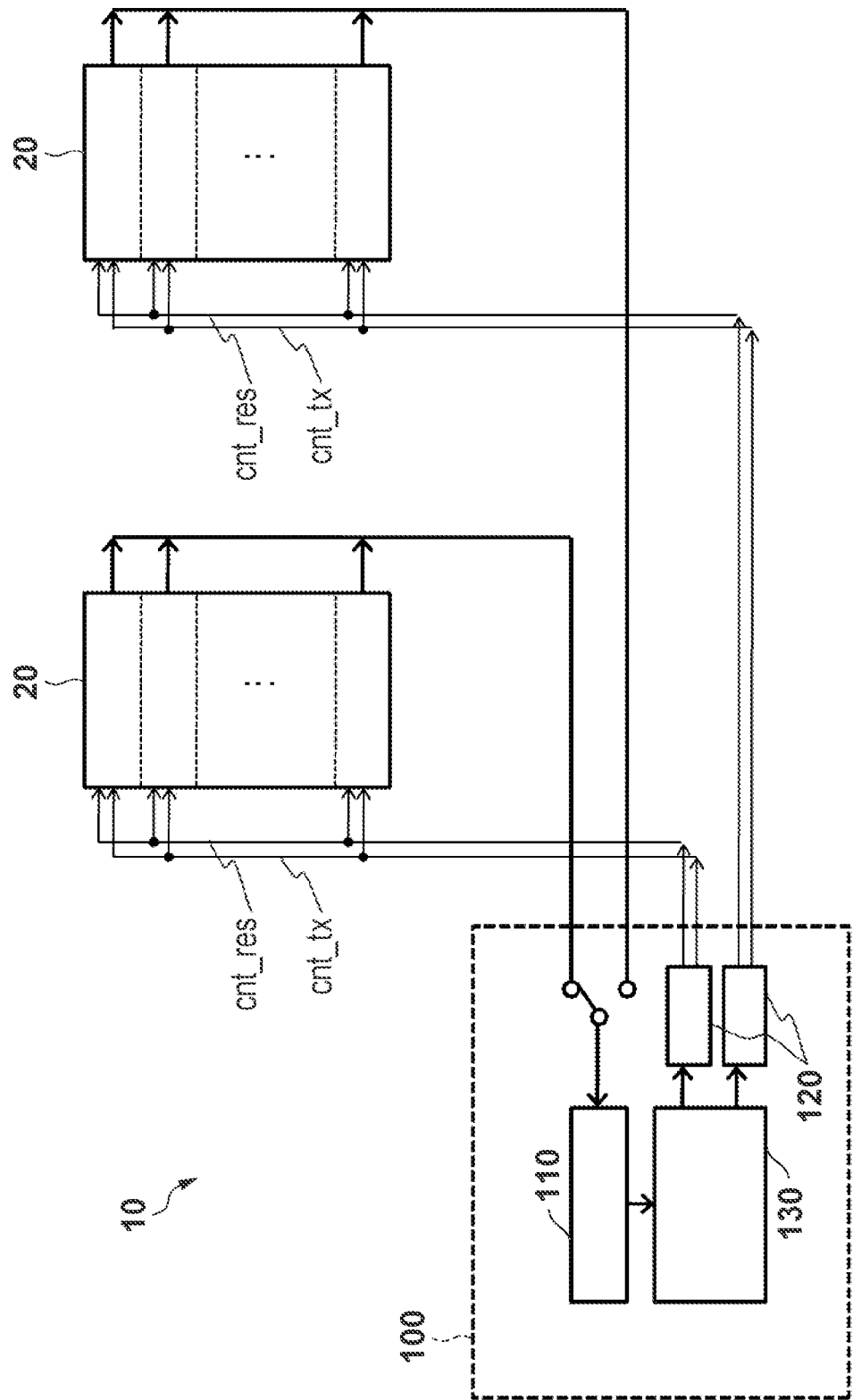
FIG. 1 is a block diagram for explaining an example of the arrangement of a semiconductor device according to the present invention.

The first embodiment of the present invention will be described with reference to FIGS. 1 to 4. A semiconductor device 10 illustrated in FIG. 1 is used for focus detection. The semiconductor device 10 includes a control unit 100, and a pair of sensor units 20 that can be arranged adjacent to each other. The control unit 100 includes a detector unit 110 that detects that the output of each sensor unit 20 has reached a predetermined value, and a signal control unit 120 that outputs a control signal to each sensor unit 20. The control unit 100 can further include a controller 130 that communicates with each of the above-described functional blocks and outputs an operation instruction. The detector unit 110 can detect one of the pair of sensor units 20 in accordance with, for example, an instruction from the controller 130.

Figure 2:
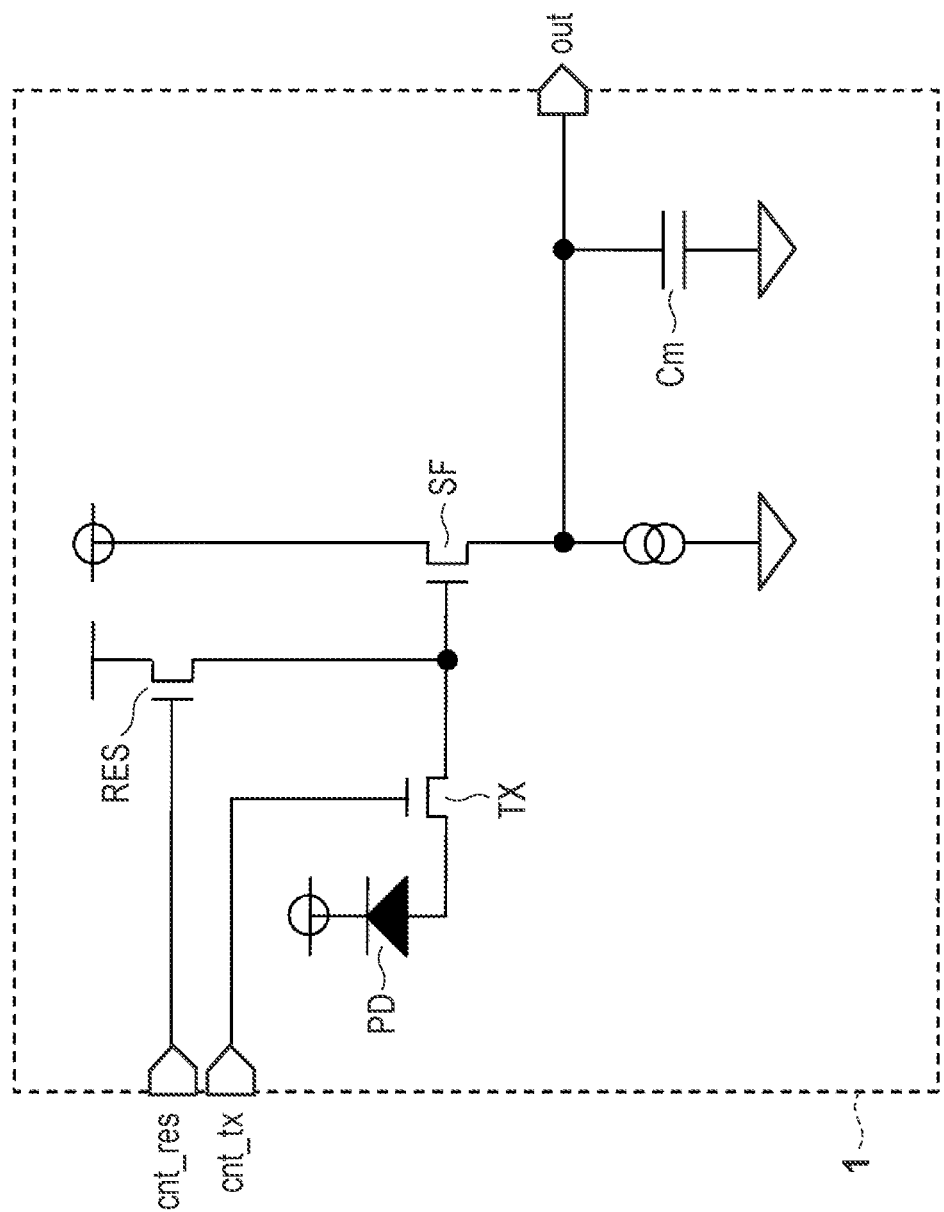
FIG. 2 is a circuit diagram for explaining the first example of the circuit arrangement of a sensor unit.

As shown in FIG. 2, the sensor unit 20 can include a plurality of sensors 1 arranged in a line. The sensor 1 includes a photodiode PD serving as a photoelectric conversion unit, and a capacitor Cm serving as a signal holding unit that holds a signal corresponding to charges generated by the photodiode PD. The sensor 1 also includes a transfer transistor TX serving as a transfer unit that transfers the signal corresponding to the charges generated by the photodiode PD to the capacitor Cm. The transfer transistor TX can enter a conductive state when, for example, a control signal cnt_tx changes to high level. The sensor 1 can also include an amplification transistor SF that amplifies a signal corresponding to the charges generated by the photodiode PD. The charges generated by the energy of light received by the photodiode PD can be transferred to the gate of the amplification transistor SF via the transfer transistor TX in the conductive state. After that, the signal amplified by the amplification transistor SF is held by the capacitor Cm and output from an output terminal 'out'. The sensor 1 can also include a reset transistor RES that resets the potential of the gate of the amplification transistor SF to a predetermined potential. The reset transistor RES can enter a conductive state when, for example, a control signal cnt_res changes to high level. The control signals cnt_res and cnt_tx can be output by, for example, the signal control unit 120.

The control unit 100 detects the amount of charges generated by one of the two sensor units 20 adjacent to each other, thereby controlling the accumulation operation of charges generated by the other sensor unit 20. More specifically, for one sensor unit 20 operating in the first mode, the control unit 100 causes the detector unit 110 to detect that the signal corresponding to the charges generated by the photodiode PD has reached a predetermined value. The detector unit 110 can do the detection by, for example, comparing the output of the sensor unit 20 with a preset reference potential. On the other hand, the control unit 100 causes the other sensor unit 20 operating in the second mode to accumulate the charges generated by the photodiode PD. The charge accumulation operation ends in accordance with the above-described detection by the detector unit 110. The charge accumulation operation is ended via the signal control unit 120 based on, for example, an instruction from the controller 130 upon receiving a detection notification. As described above, for the sensor unit 20 operating in the first mode and used for detection, the control unit 100 causes the detector unit 110 to monitor the output of the signal corresponding to the generated charges and to detect that the output has reached a predetermined value. On the other hand, the control unit 100 causes the sensor unit 20 operating in the second mode and used for signal to accumulate the generated charges and end the charge accumulation in accordance with the above-described detection, and uses a signal corresponding to the accumulated charges for focus detection.

Figure 3:
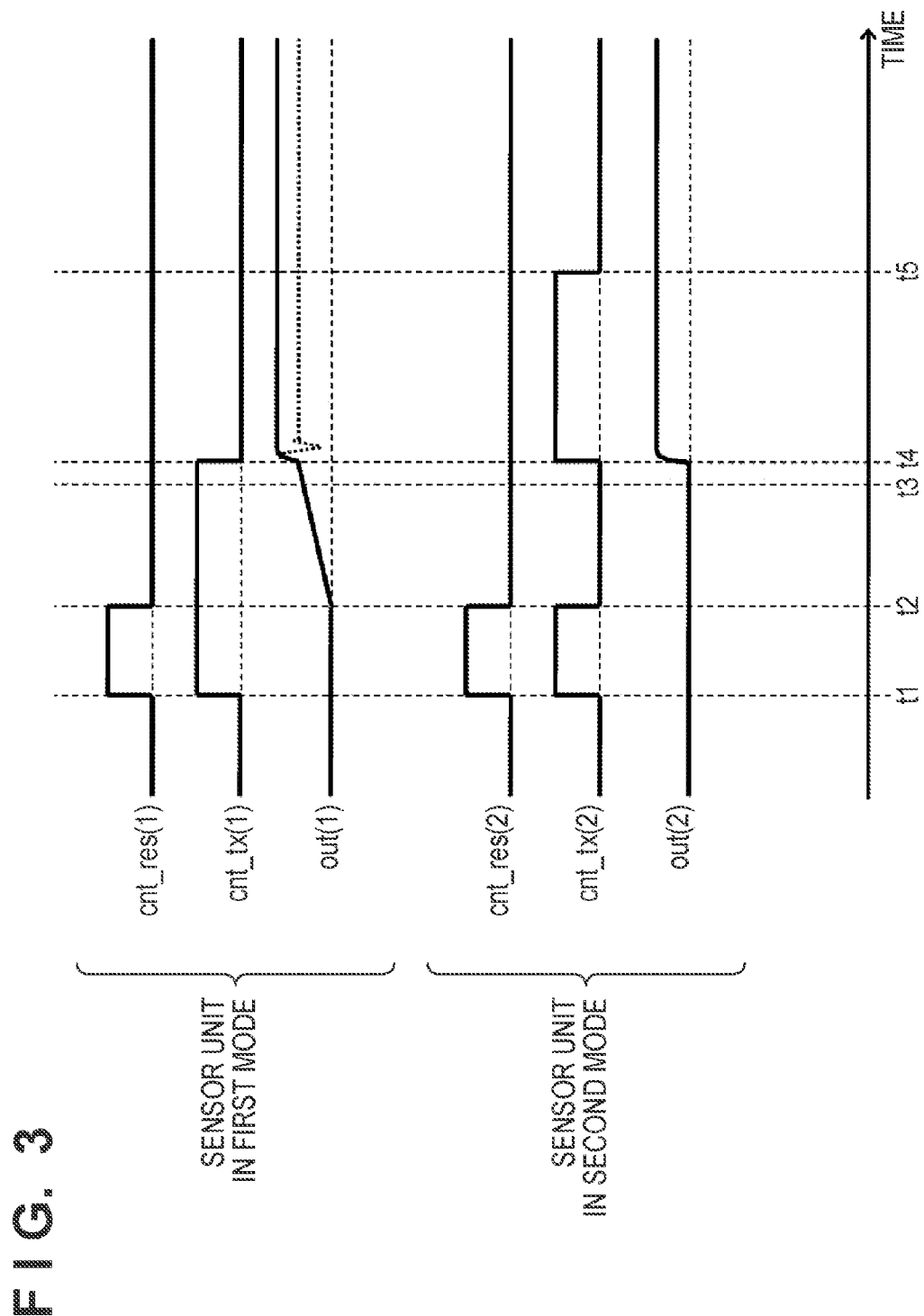

Apart from the series of focus detection operations, the signal for detection, which corresponds to the charges generated by the sensor unit 20 operating in the first mode, is separately used to perform another focus detection for the purpose of improving the focus detection accuracy. To do this, it is necessary to prevent noise as shown in FIG. 3 from mixing in the signal for detection. FIG. 3 is an example of a timing chart of the operation of the semiconductor device 10, and illustrates a case in which when the control signal of the sensor unit 20 operating in the second mode is switched, noise mixes in the signal corresponding to the charges generated by the sensor unit 20 operating in the first mode. FIG. 3 is a timing chart showing the states of the control signals cnt_res and cnt_tx and the outputs out of the sensor units 20. The signal states for the sensor unit 20 operating in the first mode are shown on the upper side of FIG. 3, and the signal states for the sensor unit 20 operating in the second mode are shown on the lower side. Symbols with suffix (1) represent the signal states for the sensor unit 20 operating in the first mode, and those with suffix (2) represent the signal states for the sensor unit 20 operating in the second mode. This also applies to the embodiments to be described later.

At time t1, cnt_res(1), cnt_tx(1), cnt_res(2), and cnt_tx(2) change to high level. Reset processing thus starts for both the sensor unit 20 in the first mode and that in the second mode.

The reset processing ends at time t2, and cnt_res(1) and cnt_res(2) change to low level. At time t2, cnt_tx(2) also changes to low level so as to set the transfer transistor TX of the sensor unit 20 operating in the second mode in a non-conductive state. Accumulation of the charges generated by the photodiode PD of the sensor unit 20 thus starts. On the other hand, cnt_tx(1) remains at high level, and the transfer transistor TX of the sensor unit 20 operating in the first mode is in the conductive state. The charges generated by the photodiode PD of the sensor unit 20 are transferred to the gate of the amplification transistor SF via the transfer transistor TX. A signal corresponding to the accumulated charge amount is amplified by the amplification transistor SF, output, and held by the capacitor Cm. After that, the signal held by the capacitor Cm raises its level along with the elapse of time in accordance with the charges generated by the photodiode PD and is output from out(1).

At a certain time, the detector unit 110 detects that the signal out(1) corresponding to the charges generated by the sensor unit 20 operating in the first mode has reached a predetermined value. This time is assumed to be time t3. The detector unit 110 can do this detection by, for example, comparing the output of the sensor unit 20 with a preset reference potential (not shown).

At time t4, cnt_tx(1) changes to low level in accordance with the detection at time t3. This aims at changing the transfer transistor TX of the sensor unit 20 operating in the first mode to the non-conductive state to determine the signal held by the capacitor Cm. At time t4, cnt_tx(2) changes to high level. This aims at changing the transfer transistor TX of the sensor unit 20 operating in the second mode to the conductive state to start transferring the signal corresponding to the charges generated by the photodiode PD of the sensor unit and accumulated to the capacitor Cm.

However, when cnt_tx(2) switches to high level at time t4, noise can mix in or out(1). For example, crosstalk noise can mix in due to the coupling capacitance between the wiring connected to out(1) and the control signal wiring of cnt_tx(2). In addition, for example, thermal noise can mix in when signal transfer starts in the sensor unit 20 operating in the second mode. The signal held by the capacitor Cm (the amount of charges accumulated in the capacitor Cm) can thus vary. At this time, if cnt_tx(1) is affected by the noise and changes to low level due to, for example, wiring delay or the like, the transfer transistor TX enters the non-conductive state while the amount of charges accumulated in the capacitor Cm remains varying. When the transfer transistor TX is set in the non-conductive state, the charge amount in the capacitor Cm becomes invariable, that is, the signal held by the capacitor Cm is determined. Hence, the signal held by the capacitor Cm can be determined while being distorted by the noise, and out(1) can be a signal (the solid line in FIG. 3) deviated from the original signal (the broken line in FIG. 3).

Figure 4:
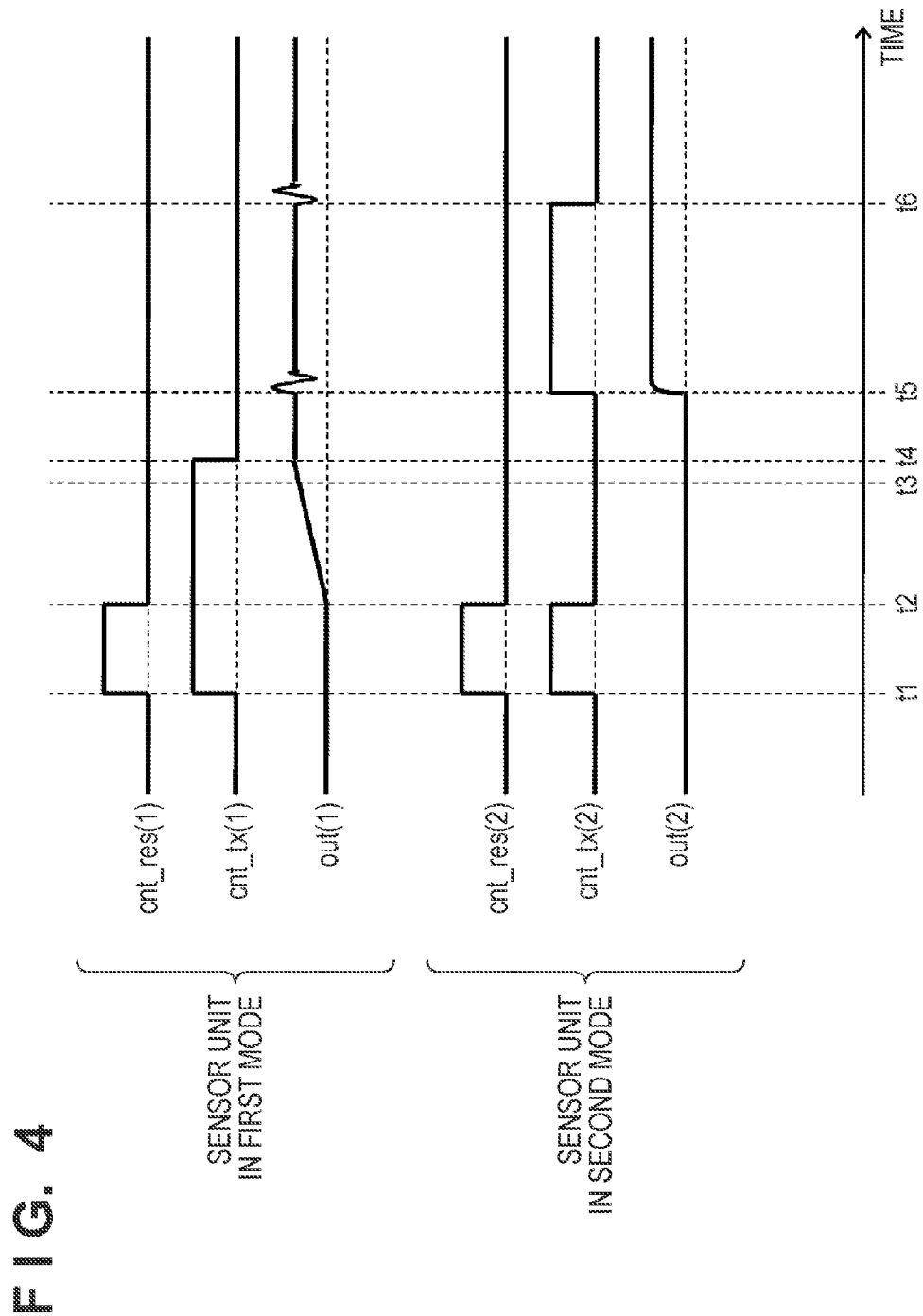
FIG. 4 is a timing chart of an operation according to the first embodiment.

In this embodiment, after the signal held by the capacitor Cm of the sensor unit 20 operating in the first mode is determined, the control signal of the sensor unit 20 operating in the second mode is switched. FIG. 4 is a control timing chart of the semiconductor device 10 according to this embodiment which uses the sensor 1 in the sensor units 20. The operation at times t1 to t3 is the same as in FIG. 3, and a description thereof will be omitted. At time t4, cnt_tx(1) changes to low level so as to set the transfer transistor TX of the sensor unit 20 operating in the first mode in the non-conductive state, thereby determining the signal held by the capacitor Cm. At time t5, cnt_tx(2) changes to high level so as to set the transfer transistor TX of the sensor unit 20 operating in the second mode in the conductive state. Thus, transferring to the capacitor Cm the signal corresponding to the charges generated by the photodiode PD of the sensor unit 20 and accumulated, is started. In addition, at time t5, the transfer transistor TX of the sensor unit 20 operating in the first mode is already in the non-conductive state, and the signal held by the capacitor Cm is determined. For this reason, out(1) is not affected by noise. After that, at time t6, cnt_tx(2) changes to low level so as to set the transfer transistor TX of the sensor unit 20 operating in the second mode in the non-conductive state, thereby determining the signal held by the capacitor Cm. The above-described operation enables the prevention of noise mixing in the signal corresponding to the charges generated by the sensor unit 20 operating in the first mode.

Second Embodiment

Figure 5:
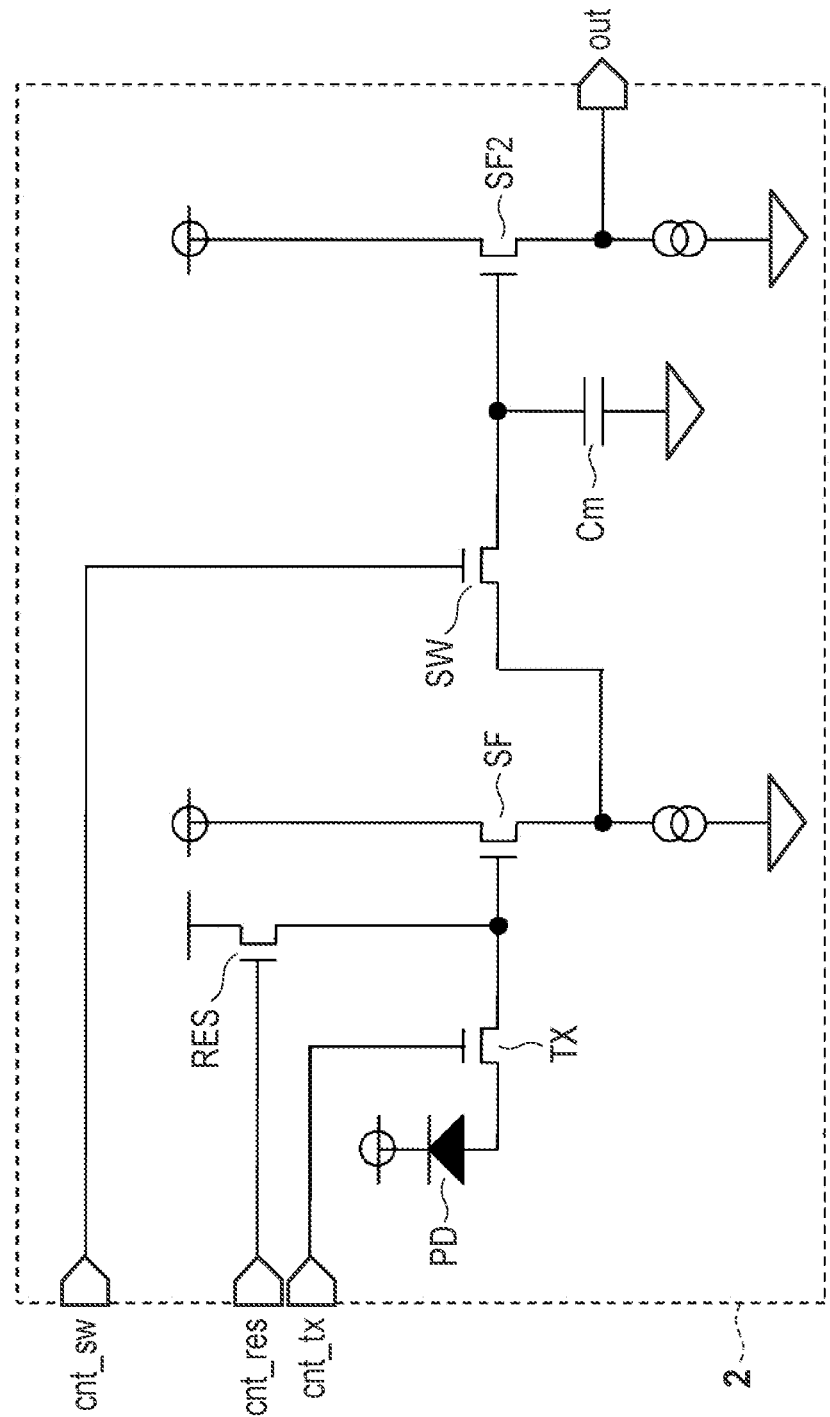
FIG. 5 is a circuit diagram for explaining the second example of the circuit arrangement of the sensor unit.

The second embodiment will be described below, in which a sensor 2 having a circuit arrangement as shown in FIG. 5 is used in sensor units 20 included in a semiconductor device 10. The sensor 2 is different from the sensor 1 of the first embodiment in that it includes a switch transistor SW between an amplification transistor SF and a capacitor Cm, and an amplification transistor SF2 at the subsequent stage of the capacitor Cm. The switch transistor SW can prevent thermal noise generated by the operation of the amplification transistor SF from mixing in the capacitor Cm. The switch transistor SW can enter a conductive state when, for example, a control signal cnt_sw changes to high level. The amplification transistor SF2 is arranged between the capacitor Cm and an output terminal out, and can prevent crosstalk noise generated by the above-described coupling capacitance from mixing in the capacitor Cm. Even in this circuit arrangement, however, it is not easy to completely prevent these kinds of noise from mixing in the capacitor Cm.

Figure 6:
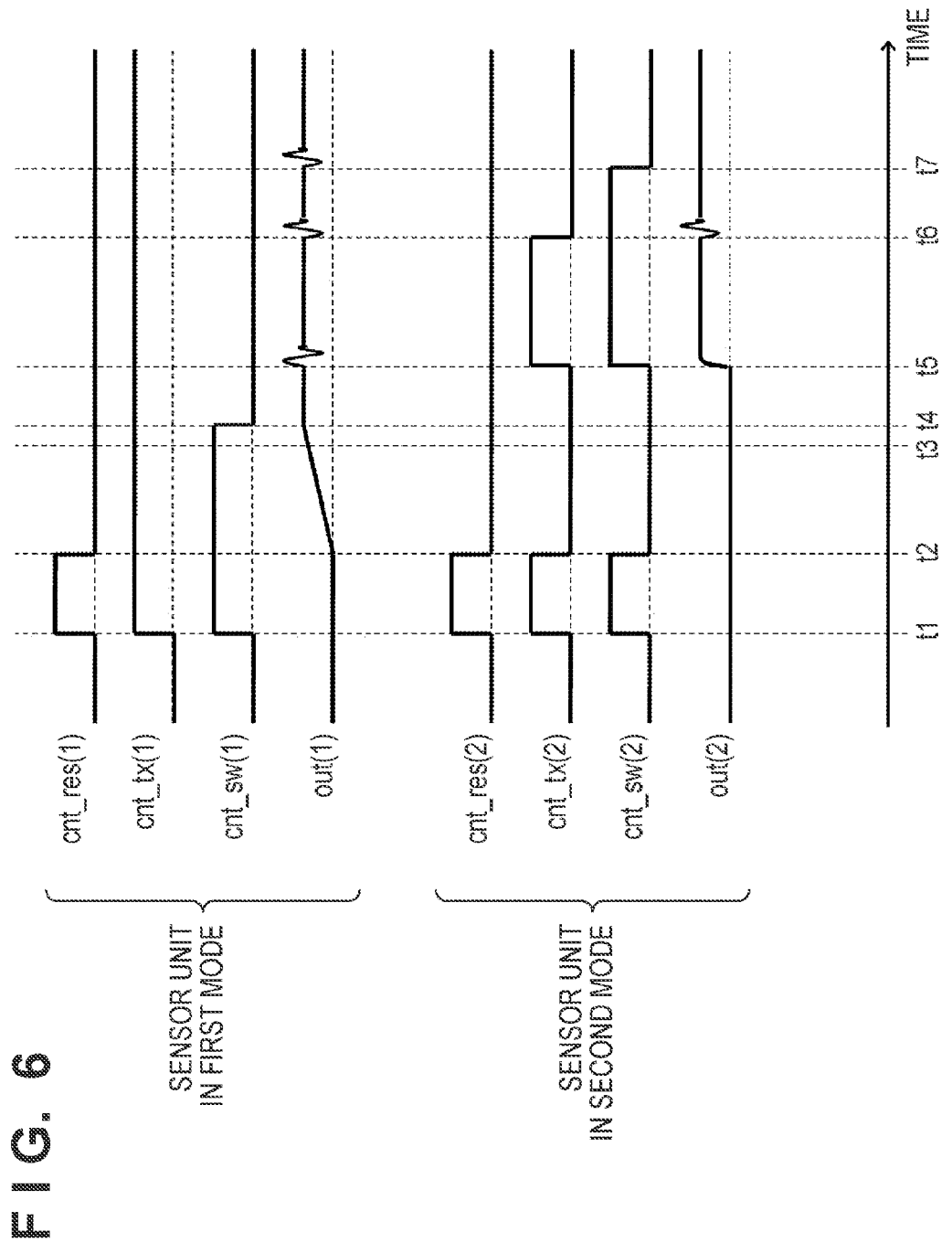
FIG. 6 is a timing chart of an operation according to the second embodiment.

FIG. 6 is a control timing chart of the semiconductor device 10 according to this embodiment which uses the sensor 2 in the sensor units 20. Although FIG. 1 shows only control signals cnt_res and cnt_tx, another control signal cnt_sw shown in FIG. 5 can also appropriately be controlled from a signal control unit 120.

At time t1, cnt_res(1), cnt_tx(1), cnt_sw(1), cnt_res(2), cnt_tx(2), and cnt_sw(2) change to high level. At time t2, cnt_res(1) and cnt_res(2) change to low level. At time t2, cnt_tx(2) and cnt_sw(2) also change to low level. On the other hand, cnt_tx(1) and cnt_sw(1) remain at high level. At a certain time, a detector unit 110 detects that out(1) has reached a predetermined value. This time is assumed to be time t3. At time t4, cnt_sw(1) changes to low level to change the switch transistor SW of the sensor unit 20 operating in the first mode to the non-conductive state. At time t5, cnt_tx(2) and cnt_sw(2) change to high level to change the transfer transistor TX and the switch transistor SW of the sensor unit 20 operating in the second mode to the conductive state. At time t6, cnt_tx(2) changes to low level so as to set the transfer transistor TX of the sensor unit 20 in the non-conductive state.

At time t7, cnt_sw(2) changes to low level so as to set the switch transistor SW of the sensor unit 20 in the non-conductive state. The above-described series of operations allows the same operation as in the first embodiment to be performed, and prevents noise from mixing in the signal corresponding to the charges generated by the sensor unit 20 operating in the first mode. The order of setting cnt_tx(2) and cnt_sw(2) at low level at times t6 and t7 may be reversed.

Third Embodiment

Figure 7:
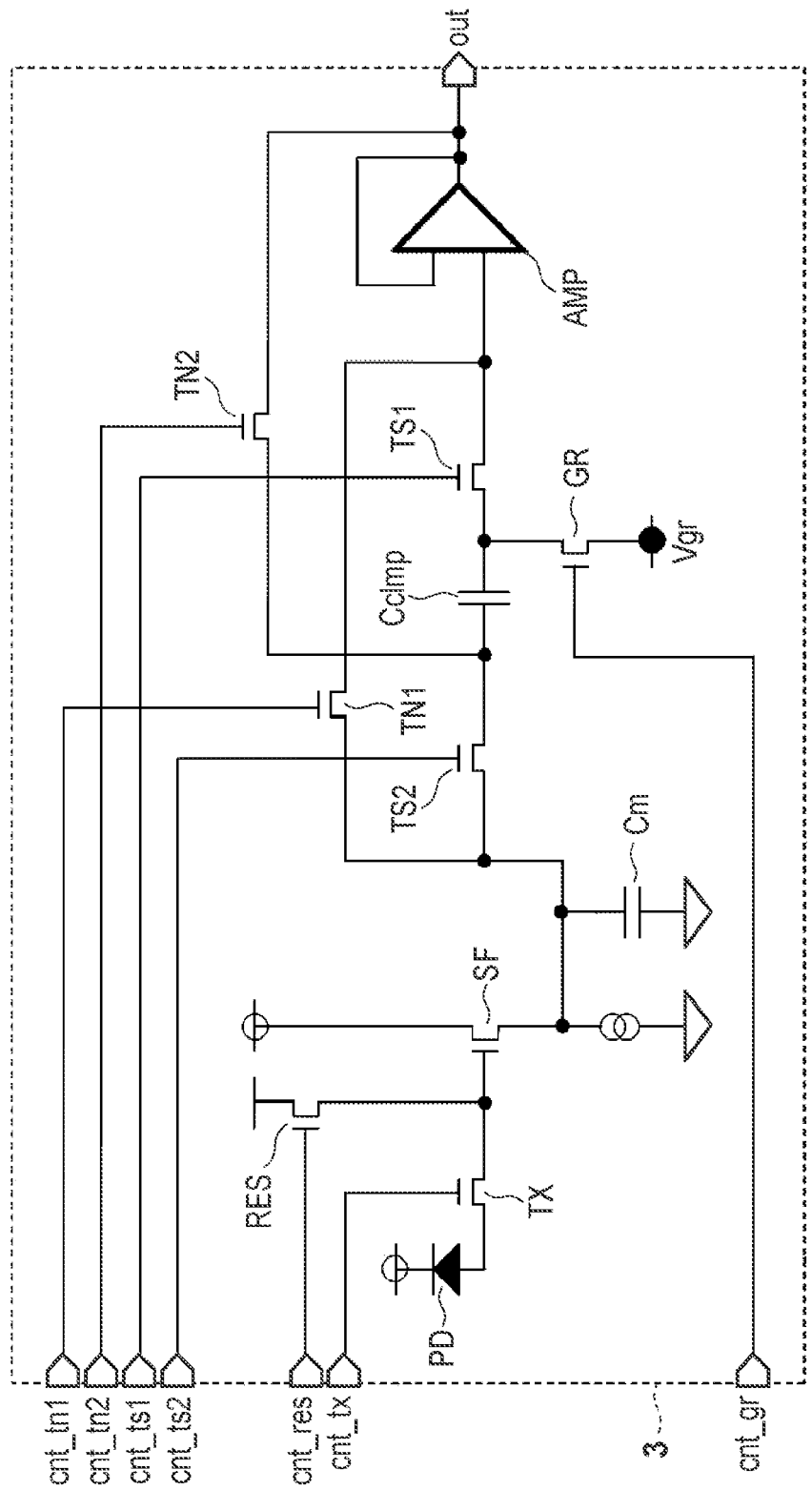
FIG. 7 is a circuit diagram for explaining the third example of the circuit arrangement of the sensor unit.

The third embodiment will be described below, in which a sensor 3 having a circuit arrangement as shown in FIG. 7 is used in sensor units 20 included in a semiconductor device 10. The sensor 3 is different from the sensor 1 of the first embodiment in that it includes an amplifier AMP, a clamp capacitor Cclmp, and a plurality of transistors (TN1, TN2, TS1, TS2, and GR) at the subsequent stage of a capacitor Cm. When an amplification transistor SF is reset (to be described later), the clamp capacitor Cclmp can clamp the output of the amplification transistor SF as the noise level. The transistors TN1 and TN2 are switches to charge the clamp capacitor Cclmp. The transistors TS1 and TS2 are switches to input the signal held by the capacitor Cm to the amplifier AMP. The transistor GR is a switch to electrically connect the path between the amplifier AMP and the clamp capacitor Cclmp to a reference voltage Vgr. These transistors can enter a conductive state when, for example, control signals cnt_tn1, cnt_tn2, cnt_ts1, cnt_ts2, and cnt_gr change to high level.

Figure 8:
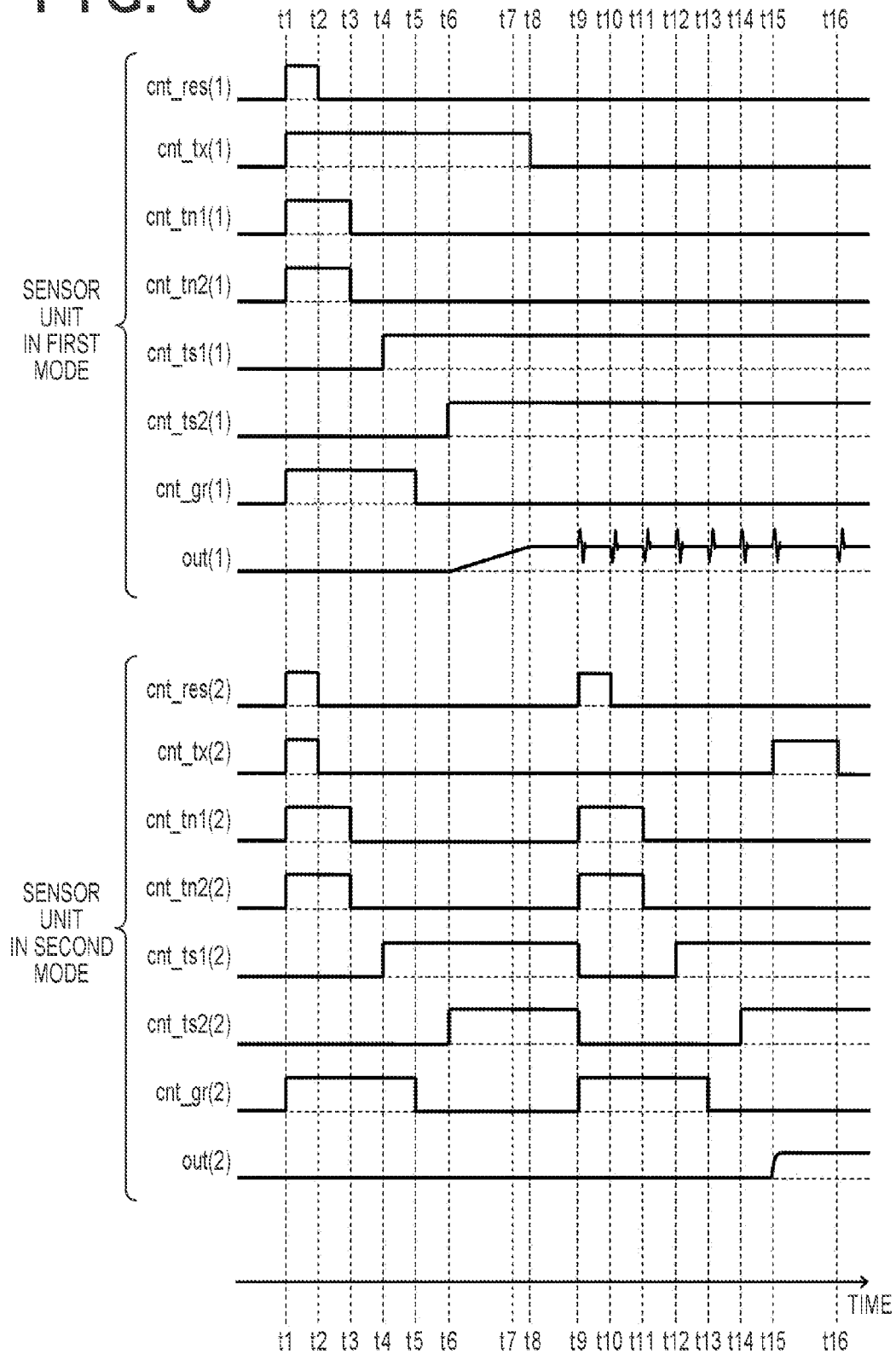
FIG. 8 is a timing chart of an operation according to the third embodiment.

FIG. 8 is a control timing chart of the semiconductor device 10 according to this embodiment which uses the sensor 3 in the sensor units 20. Although FIG. 1 shows only control signals cnt_res and cnt_tx, other control signals cnt_tn1, cnt_tn2, cnt_ts1, cnt_ts2, and cnt_gr shown in FIG. 7 can also be output from a signal control unit 120.

At times t1 to t8, signal processing for detection starts in the sensor unit 20 operating in the first mode, while the charge accumulation operation starts in the sensor unit 20 operating in the second mode. First, at time t1, cnt_res(1), cnt_tx(1), cnt_res(2), and cnt_tx(2) change to high level to start reset processing for both the sensor unit 20 in the first mode and that in the second mode. At time t1, cnt_tn1(1), cnt_tn2(1), cnt_gr(1), cnt_tn1(2), cnt_tn2(2), and cnt_gr(2) also change to high level. The clamp capacitor Cclmp can thus hold the initial level of the capacitor Cm with respect to the reference voltage Vgr. The reset processing ends at time t2, and cnt_res (1) and cnt_res(2) change to low level. At time t2, cnt_tx(2) also changes to low level so as to set a transfer transistor TX of the sensor unit 20 operating in the second mode in a non-conductive state. Accumulation of the charges generated by a photodiode PD of the sensor unit 20 thus starts. At time t3, cnt_tn1(1), cnt_tn2(1), cnt_tn1(2), and cnt_tn2(2) change to low level. The clamp capacitor Cclmp can thus clamp the output of the amplification transistor SF at this time as the noise level. At time t4, cnt_ts1(1) and cnt_ts1(2) change to high level so as to set the input level of the amplifier AMP to the reference voltage Vgr. After that, at time t5, cnt_gr(1) and cnt_gr(2) change to low level so as to electrically disconnect the input of the amplifier AMP from the reference voltage Vgr. Then, the input level of the amplifier AMP is maintained at the reference voltage Vgr. At time t6, cnt_ts2(1) changes to high level. A signal corresponding to the charges generated by the photodiode PD of the sensor unit 20 operating in the first mode can thus be output from an output terminal out(1). At this time, the clamp capacitor Cclmp can remove noise by reading the difference between the above-described noise level and the signal amplified by the amplification transistor SF. After that, out(1) raises its level along with the elapse of time in accordance with the amount of charges generated by the photodiode PD. At a certain time, a detector unit 110 detects that out(1) has reached a predetermined value. This time is assumed to be time t7. At time t8, cnt_tx(1) changes to low level in accordance with the detection at time t7. The transfer transistor TX of the sensor unit 20 operating in the first mode thus enters the non-conductive state so as to end signal transfer and determine the signal held by the capacitor Cm.

At times t9 to t16, after the signal held by the capacitor Cm of the sensor unit 20 operating in the first mode is determined, control processing of the charge accumulation operation in the sensor unit 20 operating in the second mode can start. First, at times t9 to t14, the same operation (except cnt_tx(2)) as that at times t1 to t6 can be performed in the sensor unit 20 operating in the second mode. After that, at time t15, cnt_tx(2) changes to high level. This allows the transfer transistor TX of the sensor unit 20 to be set in the conductive state and to start transferring to the capacitor Cm the signal corresponding to the charges accumulated in the sensor unit 20. At time t16, cnt_tx(2) changes to low level. The transfer transistor TX of the sensor unit 20 operating in the second mode thus enters the non-conductive state so as to determine the signal held by the capacitor Cm.

At times t9 to t16, the transfer transistor TX of the sensor unit 20 operating in the first mode is already in the non-conductive state, and the signal held by the capacitor Cm is determined. It is therefore possible to prevent noise from mixing in the signal corresponding to the charges generated by the sensor unit 20 operating in the first mode.

Fourth Embodiment

Figure 9:
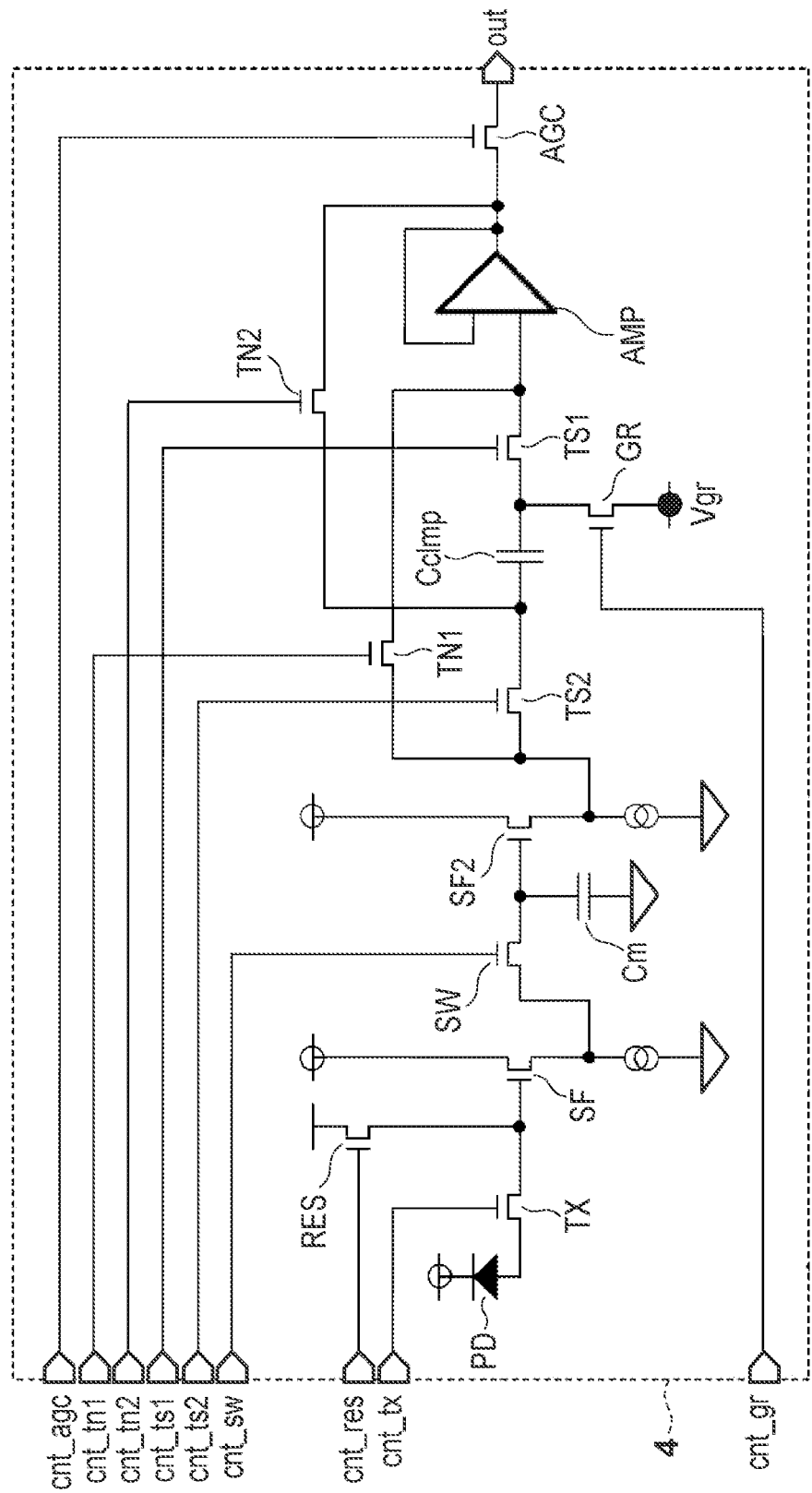
FIG. 9 is a circuit diagram for explaining the fourth example of the circuit arrangement of the sensor unit.

The fourth embodiment will be described below, in which a sensor 4 having a circuit arrangement as shown in FIG. 9 is used in sensor units 20 included in a semiconductor device 10. The sensor 4 is different from the sensor 2 of the second embodiment in that it includes an amplifier AMP, a clamp capacitor Cclmp, and a plurality of transistors (TN1, TN2, TS1, TS2, GR, and AGC) at the subsequent stage of an amplification transistor SF2. The transistor AGC is a switch arranged between an output terminal out and the output of the amplifier AMP. The transistor AGC can enter a conductive state when, for example, a control signal cnt_agc changes to high level. The rest is the same as in the third embodiment, and a description thereof will be omitted.

Figure 10:
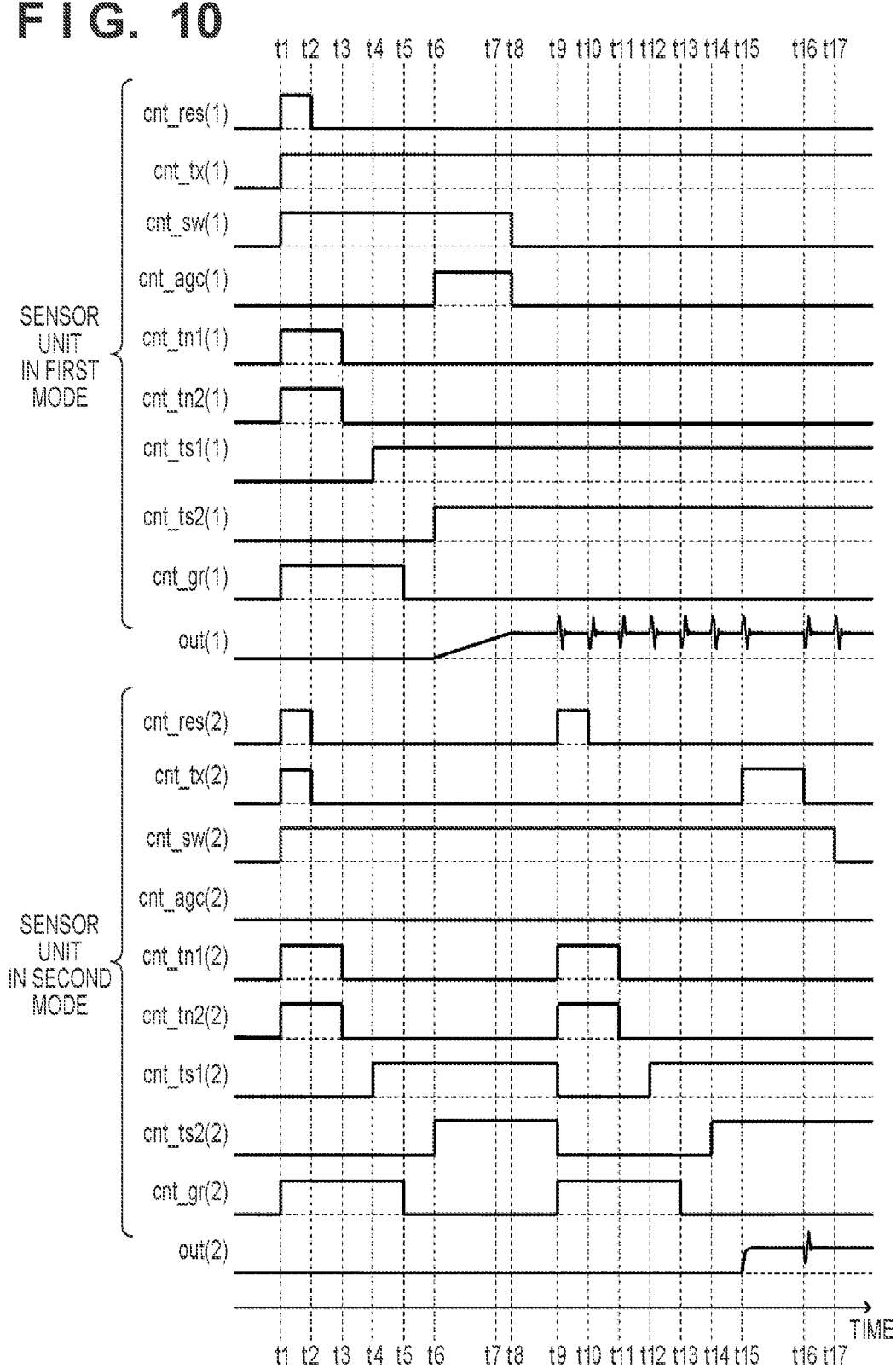
FIG. 10 is a timing chart of an operation according to the fourth embodiment.

FIG. 10 is a control timing chart of the semiconductor device 10 according to this embodiment which uses the sensor 4 in the sensor units 20. Although FIG. 1 shows control signals cnt_res and cnt_tx, other control signals cnt_tx, cnt_sw, and the like shown in FIG. 9 can also be output from a signal control unit 120.

At times t1 to t8, signal processing for detection starts in the sensor unit 20 operating in the first mode, while the charge accumulation operation starts in the sensor unit 20 operating in the second mode. First, at time t1, cnt_res(1), cnt_tx(1), cnt_res(2), and cnt_tx(2) change to high level to start reset processing for both the sensor unit 20 in the first mode and that in the second mode. At time t1, cnt_sw(1) and cnt_sw(2) can also change to high level to initialize a capacitor Cm. At time t1, cnt_tn1(1), cnt_tn2(1), cnt_gr(1), cnt_tn1(2), cnt_tn2(2), and cnt_gr(2) also change to high level. The clamp capacitor Cclmp can thus hold the initial level of the capacitor Cm with respect to a reference voltage Vgr. After that, the same operation as that at times t2 to t5 in the third embodiment can be performed. At time t6, cnt_ts2(1) and cnt_agc(1) change to high level. A signal corresponding to the charges generated by a photodiode PD of the sensor unit 20 operating in the first mode can thus be output from an output terminal out(1). At this time, the clamp capacitor Cclmp can remove noise by reading the difference between the above-described noise level and the signal amplified by an amplification transistor SF. After that, out(1) raises its level along with the elapse of time in accordance with the amount of charges generated by the photodiode PD. At certain time, a detector unit 110 detects that out(1) has reached a predetermined value. This time is assumed to be time t7. At time t8, cnt_sw(1) changes to low level in accordance with the detection at time t7. A transistor SW of the sensor unit 20 operating in the first mode thus enters the non-conductive state so as to end signal transfer and determine the signal held by the capacitor Cm. At time t8, cnt_agc(1) can also change to low level so as to set the transistor AGC in the non-conductive state and stop output of the signal held by the capacitor Cm.

At times t9 to t17, after the signal held by the capacitor Cm of the sensor unit 20 operating in the first mode is determined, control processing of the charge accumulation operation in the sensor unit 20 operating in the second mode can start. First at times t9 to t14, the same operation (except cnt_tx(2)) as that at times t1 to t6 can be performed in the sensor unit 20 operating in the second mode. After that, at time t15, cnt_tx(2) changes to high level. This allows the transfer transistor TX of the sensor unit 20 to be set in the conductive state and to start transferring, to the capacitor Cm, the signal corresponding to the charges accumulated in the sensor unit 20. At time t16, cnt_tx(2) changes to low level so a to set the transfer transistor TX of the sensor unit 20 in the non-conductive state. At time t17, cnt_sw(2) changes to low level so as to set the switch transistor SW of the sensor unit 20 in the non-conductive state. The signal held by the capacitor Cm is thus determined.

At times t9 to t17, the transfer transistor TX of the sensor unit 20 operating in the first mode is already in the non-conductive state, and the signal held by the capacitor Cm is determined. It is therefore possible to prevent noise from mixing in the signal corresponding to the charges generated by the sensor unit 20 operating in the first mode. In this embodiment, cnt_sw(2) may be at low level at times t4 to t9. In addition, for example, at time t8, cnt_tx(1) may be at low level. The order of setting cnt_tx(2) and cnt_sw(2) at low level at times t16 and t17 may be reversed.

The four embodiments have been described above. However, the present invention is not limited to the embodiments. Various changes can be made as needed for the object, state, application purpose, function, and any other specifications, which can be practiced by other embodiments, as a matter of course. The sensor unit is formed as, for example, a CMOS image sensor, and a sensor of any other type is usable. The operations of the above-described functional blocks can be controlled partially or wholly by an OS or the like operating on a computer in cooperation with or in place of the controller.

Figure 11:
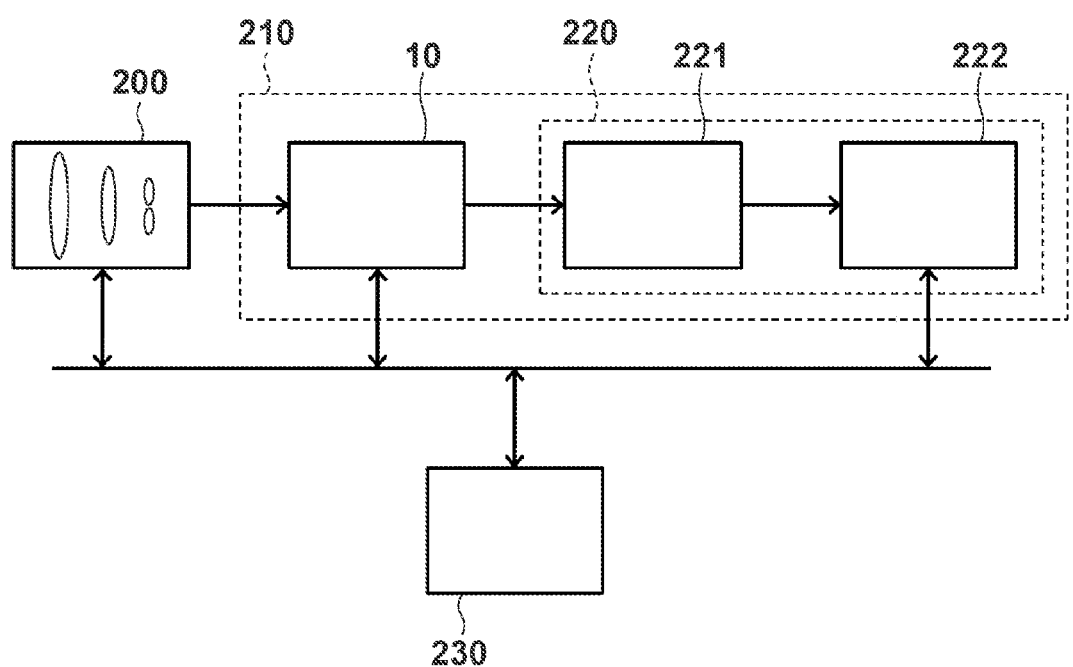
FIG. 11 is a block diagram for explaining the focusing system of a camera to which the semiconductor device of the present invention is applied.

The system block diagram of FIG. 11 shows the focusing system of a camera to which the semiconductor device 10 is applied a focus detection apparatus. The system shown in FIG. 11 can include an optical system 200, a focus detection apparatus 210, and a CPU 230. The optical system 200 can include a fixed lens, a movable lens for focusing, a mirror, and a separator lens for phase-difference detection. The focus detection apparatus 210 can include the semiconductor device 10 and a calculation unit 220. The calculation unit 220 can include an analog/digital converter 221 that converts an analog signal output from the semiconductor device 10 into a digital signal, and a signal processing unit 222 that processes the digital signal. The calculation unit 220 calculates the defocus amount. Based on the result, the optical system 200 is controlled in accordance with, for example, an instruction from the CPU 230 to focus the camera. The CPU 230 can also continuously control the semiconductor device 10.

The above description concerns a semiconductor device for focus detection included in a camera. The concept of the camera includes not only an apparatus mainly aiming at image capturing but also an apparatus (for example, personal computer and mobile terminal) secondarily having an image capturing function. The camera can include a focus detection apparatus including the semiconductor device according to the present invention described in the above embodiments, a solid-state image capturing device, and a processing unit that processes a signal output from the solid-state image capturing device. The processing unit can include, for example, an A/D converter, and a processor that processes digital data output from the A/D converter. The processing unit may perform the focus detection operation, or the semiconductor device may include a calculation unit that executes the focus detection operation. Various changes can be made as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-196499, filed Sep. 8, 2011, which is hereby incorporated by reference herein in its entirety.

What is claimed is:

1. A semiconductor device including a pair of sensor units each of which includes a photoelectric conversion unit, a signal holding unit, and a transfer unit, and that outputs a signal corresponding to a signal held by said signal holding unit, comprising:
a control unit including a detector unit,
wherein said signal holding unit holds the signal corresponding to charges generated by said photoelectric conversion unit,
said transfer unit transfers, to said signal holding unit, the signal corresponding to the charges generated by said photoelectric conversion unit in a conductive state,
when one of said pair of sensor units operates in a first mode, the other operates in a second mode,
after said transfer unit in the conductive state has started signal transfer in said sensor unit operating in the first mode, said detector unit detects that the signal output from said sensor unit has reached a predetermined value,
said sensor unit operating in the first mode sets said transfer unit to a non-conductive state in response to the detection to end the signal transfer and thus determine the signal held by said signal holding unit,
said control unit generates a control signal after an elapse of a predetermined time from the detection, and
said sensor unit operating in the second mode sets said transfer unit of said sensor unit to the non-conductive state so as to accumulate the charges generated by said photoelectric conversion unit, sets said transfer unit of said sensor unit operating in the second mode in the conductive state in accordance with the control signal so as to start transfer of the signal corresponding to the generated charges, and then sets said transfer unit in the non-conductive state to end the signal transfer and thus determine the signal held by said signal holding unit.

2. The device according to claim 1, wherein
each of said pair of sensor units further includes a reset unit that resets said photoelectric conversion unit, a clamp capacitor that holds a potential corresponding to a potential of said signal holding unit, and an amplifier electrically connected to said clamp capacitor,
said clamp capacitor clamps a first potential corresponding to the potential of said signal holding unit when said reset unit in said sensor unit has reset said photoelectric conversion unit, and
said amplifier outputs a signal by amplifying a difference between the clamped first potential and a second potential corresponding to the potential of said signal holding unit after the charges have been accumulated.

3. The device according to claim 1, further comprising a second pair of sensor units having the same arrangement as that of said pair of sensor units,
wherein said pair of sensor units alternately perform an operation in the first mode and an operation in the second mode, and said second pair of sensor units alternately perform the operation in the first mode and the operation in the second mode.

4. A focus detection apparatus comprising:
a semiconductor device of claim 1; and
a calculation unit that executes a focus detection operation based on a signal output from said semiconductor device.

5. A camera comprising:
a focus detection apparatus of claim 4;
a solid-state image capturing device; and
a processing unit that processes a signal output from said solid-state image capturing device.

6. A method of driving a semiconductor device including a pair of sensor units and a detector unit,
each of the pair of sensor units including a photoelectric conversion unit, a signal holding unit, and a transfer unit and outputting a signal corresponding to a signal held by the signal holding unit,
the signal holding unit holding the signal corresponding to charges generated by the photoelectric conversion unit, and the transfer unit transferring, to the signal holding unit, the signal corresponding to the charges generated by the photoelectric conversion unit in a conductive state, and
one of the pair of sensor units operating in a first mode, and the other operating in a second mode,
the method comprising:
a detection step of, after the transfer unit in the conductive state has started signal transfer in the sensor unit operating in the first mode, causing the detector unit to detect that the signal output from the sensor unit has reached a predetermined value;
a first determination step of causing the sensor unit operating in the first mode to set the transfer unit to a non-conductive state in response to the detection in the detection step to end the signal transfer and thus to determine the signal held by the signal holding unit;
a second determination step of causing the sensor unit operating in the second mode to set the transfer unit of the sensor unit to the non-conductive state so as to accumulate the charges generated by the photoelectric conversion unit, set the transfer unit of the sensor unit operating in the second mode in the conductive state after the first determination step so as to start transfer of the signal corresponding to the generated charges, and then set the transfer unit in the non-conductive state to end the signal transfer and thus to determine the signal held by the signal holding unit.

7. The method according to claim 6, wherein each of the pair of sensor units further includes a reset unit that resets the photoelectric conversion unit, a clamp capacitor that holds a potential corresponding to a potential of the signal holding unit, and an amplifier electrically connected to the clamp capacitor, and the method further comprises:
- a clamp step of causing the clamp capacitor to clamp a first potential corresponding to the potential of the signal holding unit when the reset unit in the sensor unit has reset the photoelectric conversion unit; and
- a signal output step of causing the amplifier to output a signal by amplifying a difference between the clamped first potential and a second potential corresponding to the potential of the signal holding unit after the charges have been accumulated.

8. A semiconductor device including a pair of sensor units each of which includes a photoelectric conversion unit, a signal holding unit, and a transfer unit and that outputs a signal corresponding to a signal held by said signal holding unit,
- wherein said signal holding unit holds the signal corresponding to charges generated by said photoelectric conversion unit,
- said transfer unit transfers, to said signal holding unit, the signal corresponding to the charges generated by said photoelectric conversion unit in a conductive state, and
- in a case where one of said pair of sensor units operates in a first mode and the other operates in a second mode,
- a first sensor unit, which operates in the first mode,
  - sets, after said transfer unit in the conductive state has started signal transfer of said first sensor unit and the signal output from said first sensor unit has reached a predetermined value, said transfer unit of said first sensor unit to a non-conductive state so as to end the signal transfer, and
- a second sensor unit, which operates in the second mode,
  - sets said transfer unit of said second sensor unit to the non-conductive state, when said transfer unit of said first sensor unit is the conductive state,
  - sets said transfer unit of said second sensor unit to the conductive state so as to start transfer of the signal corresponding to the generated charges, after elapse of a predetermined time after said transfer unit of said first sensor unit is set to the non-conductive state, and then
  - sets said transfer unit of said second sensor unit to the non-conductive state to end the signal transfer.

9. The device according to claim 8, wherein
- each of said pair of sensor units further includes a reset unit that resets said photoelectric conversion unit, a clamp capacitor that holds a potential corresponding to a potential of said signal holding unit, and an amplifier electrically connected to said clamp capacitor,
- said clamp capacitor clamps a first potential corresponding to the potential of said signal holding unit when said reset unit in said sensor unit has reset said photoelectric conversion unit, and
- said amplifier outputs a signal by amplifying a difference between the clamped first potential and a second potential corresponding to the potential of said signal holding unit after the charges have been accumulated.

10. The device according to claim 8, further comprising a second pair of sensor units having the same arrangement as that of said pair of sensor units,
- wherein said pair of sensor units alternately perform an operation in the first mode and an operation in the second mode, and said second pair of sensor units alternately perform the operation in the first mode and the operation in the second mode.

11. A focus detection apparatus comprising:
a semiconductor device of claim 8; and
a calculation unit that executes a focus detection operation based on a signal output from said semiconductor device.

12. A camera comprising:
a focus detection apparatus of claim 11;
a solid-state image capturing device; and
a processing unit that processes a signal output from said solid-state image capturing device.

* * * * *